(12) United States Patent
Sundaresan et al.

(10) Patent No.: US 8,938,445 B2
(45) Date of Patent: Jan. 20, 2015

(54) SYSTEM AND METHOD FOR ROWSET INSERTS

(75) Inventors: Sandhya Sundaresan, San Jose, CA (US); Suresh Subbiah, Plano, TX (US); Michael J. Hanlon, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 13/522,787

(22) PCT Filed: Mar. 5, 2010

(86) PCT No.: PCT/US2010/026401
§ 371 (c)(1),
(2), (4) Date: Jul. 18, 2012

(87) PCT Pub. No.: WO2011/109025
PCT Pub. Date: Sep. 9, 2011

(65) Prior Publication Data
US 2012/0296890 A1    Nov. 22, 2012

(51) Int. Cl.
G06F 7/00   (2006.01)
G06F 17/30   (2006.01)

(52) U.S. Cl.
CPC .... *G06F 17/30383* (2013.01); *G06F 17/30377* (2013.01); *G06F 17/3038* (2013.01)
USPC ........................................................ 707/718

(58) Field of Classification Search
None
See application file for complete search history.

(56) References Cited

U.S. PATENT DOCUMENTS

| | | | |
|---|---|---|---|
| 6,125,360 A | 9/2000 | Witkowski et al. |
| 6,460,043 B1 | 10/2002 | Tabbara et al. |
| 6,575,361 B1 | 6/2003 | Graves et al. |
| 7,083,084 B2 | 8/2006 | Graves et al. |
| 2005/0102326 A1 | 5/2005 | Peleg et al. |
| 2006/0085409 A1 | 4/2006 | Rys et al. |
| 2007/0022103 A1 | 1/2007 | Rys et al. |
| 2007/0043749 A1 | 2/2007 | Gerber et al. |
| 2009/0193060 A1 | 7/2009 | Stefani et al. |

OTHER PUBLICATIONS

HP Neoview Transporter User Guide Apr. 8, HP, 2.3, 110 pages.*
Neoview Query Guide Apr. 8, HP, 2.3, 58 pages.*
HP Neoview SQL Reference Manual Aug. 7, HP, 2.2, 462 pages.*
Neoview Control Query Default (CQD) Reference Guide Sept 10, HP, 2.5, 64 pages.*
HP Neoview Messages Manual Apr. 8, HP, 2.3, 498 Pages.*
Lane et al., Oracle Database Data Warehousing Guide 2005 10g Release 2, pp. 25-1 through 25-66.*
PCT; "PCT International Search Report" cited in PCT/US2010/026401; 3 pages.
Oracle, Oracle Warehouse Builder User Guide, 11g Release 1(11.1), B31278-06, Jan. 2009, 70 Pages, XP055095677A.

* cited by examiner

*Primary Examiner* — Jason Liao

(57) ABSTRACT

There is provided a computer-executed method of executing a rowset insert against a database. The method comprises receiving a structured query language statement (SQL) specifying the rowset insert. Additionally, the method comprises raising an error for a first row of the rowset insert. The method also comprises updating a table for a second row of the rowset insert. Further, the method comprises updating a materialized view of the table based on the second row. Additionally, the method comprises performing a commit to the database. The table comprises the second row, and the updated materialized view is consistent with the table.

20 Claims, 7 Drawing Sheets

SYSTEM AND METHOD FOR ROWSET INSERTS

CROSS-REFERENCE TO RELATED APPLICATION

Pursuant to 35 U.S.C. §371, this application is the United States National Stage Application of International Patent Application No. PCT/US2010/026401, filed on 5 Mar. 2010, the contents of which are incorporated by reference as if set forth in their entirety herein.

BACKGROUND

A rowset insert is a database operation that allows for inserting large numbers of rows into a database table. Inserting large numbers of rows into a database table is part of a typical operational Business Intelligence. Depending on the quality of input data, several of the rows that are being inserted may raise constraint violation or expression evaluation errors.

Frequently, the tables to which rows are being inserted may have one or more dependent tables, such as Materialized Views, Referential Integrity Constraints and indices. Typically, the insert operation proceeds asynchronously into all the dependent objects. As such, if an insert of a row into the base table succeeds, an insert of the same row into the dependent objects may be attempted. If the insert into of the dependent object raises an error, continuing the insert operation may result in an inconsistent database.

Typically, when a large number of rows are inserted in the form of a rowset, any error that is raised due to a constraint violation or during expression evaluation may cause the whole insert operation to be aborted. The error row may then be removed and the insert operation tried again. If there are N error rows in a rowset, then N+1 attempts may be needed before all the good rows in the rowset are inserted into the table.

BRIEF DESCRIPTION OF THE DRAWINGS

Certain exemplary embodiments are described in the following detailed description and in reference to the drawings, in which.

DETAILED DESCRIPTION

Figure 1A:
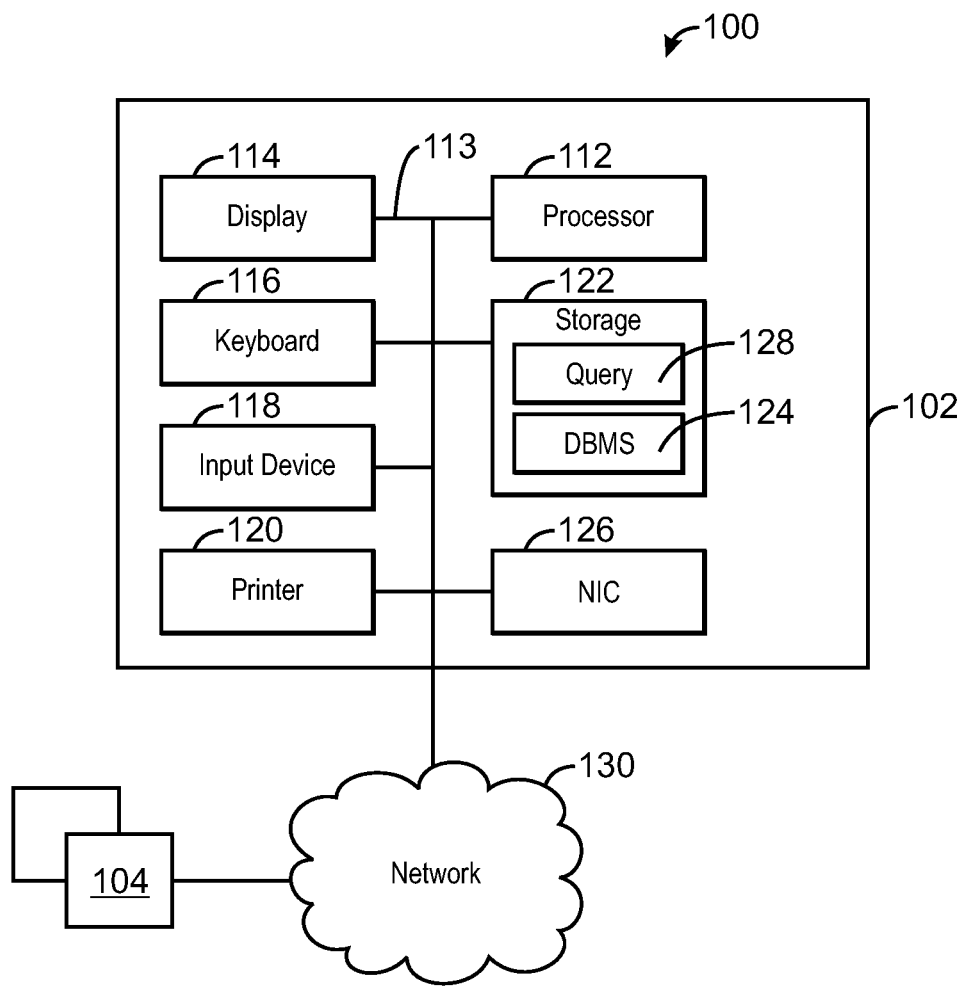
FIG. 1A is a block diagram of a system adapted to execute a rowset insert according to an exemplary embodiment of the present invention.

FIG. 1A is a block diagram of a system adapted to execute a rowset insert on a database management system according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include a processor 112 which may be connected through a bus 113 to a display 114, a keyboard 116, one or more input devices 118, and an output device, such as a printer 120. The input devices 118 may include devices such as a mouse or touch screen.

The database server 102 may also be connected through the bus 113 to a network interface card (NIC) 126. The NIC 126 may connect the database server 102 to the network 130. The network 130 may be a local area network (LAN), a wide area network (WAN), or another network configuration. The network 130 may include routers, switches, modems, or any other kind of interface device used for interconnection.

Through the network 130, several client computers 104 may connect to the database server 102. The client computers 104 may be similarly structured as the database server 102, with exception to the storage of the DBMS 124. In an exemplary embodiment, the client computers 104 may be used to submit the query 128 to the database server 102 for execution by the DBMS 124.

The database server 102 may have other units operatively coupled to the processor 112 through the bus 113. These units may include tangible, machine-readable storage media, such as a storage 122. The storage 122 may include media for the long-term storage of operating software and data, such as hard drives. The storage 122 may also include other types of tangible, machine-readable media, such as read-only memory (ROM), random access memory (RAM), and cache memory. The storage 122 may include the software used in exemplary embodiments of the present techniques.

The storage 122 may include a database management system (DBMS) 124 and a query 128. The DBMS 124 may be a set of computer programs that controls the creation, maintenance, and use of databases by an organization and its end users. The DBMS 124 is described in greater detail with reference to FIG. 1B.

The query 128 may be a relational query language statement for performing a rowset insert for a table stored in the DBMS 124. Relational query languages may include any query language configured to access and update data stored in a relational database. In an exemplary embodiment, the relational query language statements may be Structured Query Language (SQL) statements.

The candidate rows of the rowset insert may be received from the client computer. In an exemplary embodiment of the invention the rows may be received in a trickle feed.

Figure 1B:
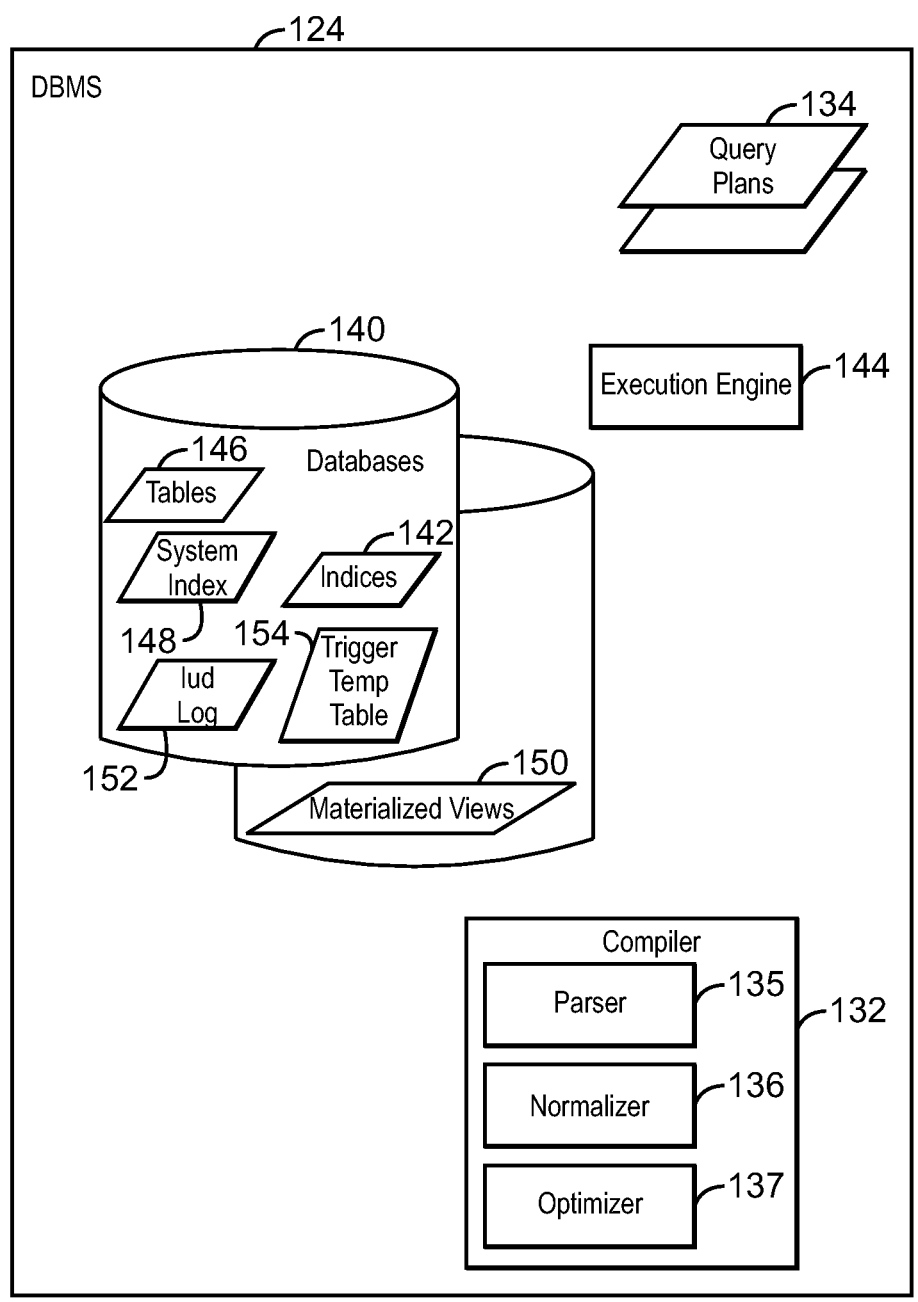
FIG. 1B is a block diagram of a database management system adapted to execute a rowset insert according to an exemplary embodiment of the present invention.

FIG. 1B is a block diagram of the DBMS 124 adapted to execute a rowset insert according to an exemplary embodiment of the present invention. As illustrated, the DBMS 124 may include a compiler 132, the query plans 134, and several databases 140 against which the query plans 134 may be executed. The databases 140 may include user data organized into tables 146, rows and columns, typical of a relational DBMS.

The databases 140 may also include table indices 142, which may identify one or more rows in a particular table 146 based on a key. The key may include one or more user-specified columns for the table 146. If no column is specified, a clustering key may be stored in the index 142. Identifying the one or more rows with an index 142 may enable direct access to one or more rows of the table 146.

The databases 140 may also include a system index 148, which may be used to enforce referential integrity (RI) constraints. In an exemplary embodiment of the invention one of the tables 146, referred to herein as a base table, may have an RI constraint. When a base table has an RI constraint, the base table may include a column known as a foreign key. The foreign key may identify a row in another table 146, referred to here as a foreign key table. The RI constraint may prohibit the creation of a row in the base table unless a row with the foreign key exists in the foreign key table.

Foreign keys are typically used to define relationships between different groups of data. For example, consider the following example tables of EMPLOYERS and EMPLOYEES:

| EMPLOYER TABLE |
| --- |
| EMPLOYER NAME |
| COMPANY A |
| COMPANY B |

| EMPLOYEE TABLE | |
| --- | --- |
| EMPLOYEE NAME | EMPLOYER NAME |
| JOHN DOE | COMPANY A |
| JANE DOE | COMPANY A |
| JOHN PUBLIC | COMPANY B |

In this example, the EMPLOYEE table may be the base table, and the EMPLOYER table may be the foreign key table, and the EMPLOYER NAME may be the foreign key. As shown, the EMPLOYER NAME is a column in the EMPLOYEE table and the EMPLOYER table. By applying an RI constraint on the EMPLOYEE table, no rows may be created in the EMPLOYEE table unless the EMPLOYER NAME in the EMPLOYEE row matches an EMPLOYER NAME in the EMPLOYER table.

As shown, each row in the EMPLOYEE table includes a value for EMPLOYER NAME that exists in a row of the EMPLOYER table. Specifically, the EMPLOYEE table includes EMPLOYER NAMEs of both "COMPANY A" and "COMPANY B". Because of the RI constraint on the EMPLOYEE table, a row could not be created in the EMPLOYEE table with the EMPLOYER NAME, "COMPANY C" because there are no rows in the EMPLOYER table with an EMPLOYER NAME of "COMPANY C."

Typically, the DBMS 124 may use the system index 148 to enforce RI constraints. The system index 148 may include a row for each row in a table with an RI constraint.

In an exemplary embodiment of the invention, one or more tables 146 may have a materialized view 150. The materialized view 150 may represent the result of a database query against the table 146. Materialized views 150 may be updated periodically, instead of in real-time. Periodic updates may enable efficient access at the cost of some data being potentially out-of-date.

The materialized view 150 may be either an on-request or an on-statement type. The different types of materialized views 150 may represent the different methods by which the materialized view 150 is updated.

For example, the on-request materialized view may be updated with an insert-update-delete (IUD) log 152. Whenever an update to a table 146 implicates an update to a materialized view 150, a row may be created in the IUD log 152. The row created in the IUD log 152 may specify a command to be executed against the materialized view 150 at a later time.

For example, a row may be inserted into a table 146 with a materialized view 150. Instead of inserting a corresponding row into the materialized view 150 in real-time, an "INSERT" row may be created in the IUD log 152 that may be retrieved at a later time to create a corresponding row in the materialized view 150.

The on-statement type of materialized view 150 may be created using row triggers. Every row inserted into a table 146 with the materialized view 150 may be inserted into a trigger temp table 154.

The compiler 132 may be software that generates the query plans 134, which are implemented at runtime by the execution engine 144. The compiler 132 may consist of several modules, including, but not limited to, a parser 135, a normalizer 136, and an optimizer 137. Each of the modules may perform a separate phase of query plan generation.

In one phase, the parser 135 may perform syntax checking on the query 128. The parser 135 may also build a query tree, which may be an algebraic tree representation of the query 128. In another phase, a normalizer 136 may transform the query tree into a form for optimization, such as a canonical tree form.

In yet another phase, the optimizer 137 may generate several potential query plans 134 to determine the execution strategy for the query 128. The potential query plans 134 may be based on the query tree in the canonical tree form. The potential query plan 134 with the minimal processing cost may be selected for the execution strategy.

Figure 2:
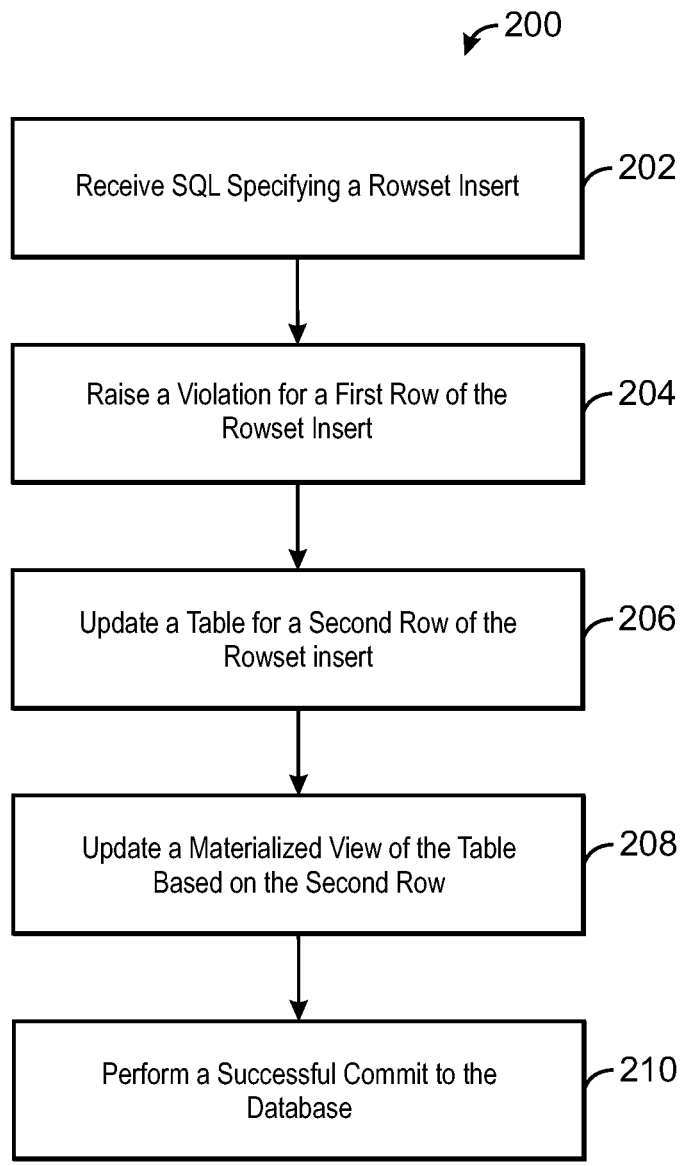
FIG. 2 is a process flow diagram showing a computer-executed method for executing a rowset insert according to an exemplary embodiment of the present invention.

FIG. 2 is a process flow diagram showing a computer-executed method for executing a rowset insert according to an exemplary embodiment of the present invention. The method is generally referred to by the reference number 200, and may be performed by the DBMS 124. It should be understood that the process flow diagram is not intended to indicate a particular order of execution.

The method may begin at block 202. At block 202, the DBMS 124 may receive SQL specifying a rowset insert. The SQL may identify multiple rows to be inserted into a base table.

At block 204, the execution engine 144 may raise an error for a first row of the rowset insert. The error may be a constraint violation or an expression evaluation error. The expression evaluation error may result when a value of a column does not accord with type, range value, or other definitions limiting a column's value to specified domains. For example, a column may be limited to text or numeric domains. Ranges of permissible values may even be specified for a column. Attempting to populate a row with a column value outside of these specified domains may result in an expression evaluation error.

At block 206 a table may be updated for a second row of the rowset insert. An insert may be performed of the second row into the table, referred to herein as a base table. The base table may have a materialized view.

At block 208, the materialized view 150 of the base table may be updated based on the second row. The materialized view 150 may be updated to include a new row corresponding to the new rows inserted into the base table at block 206. In an exemplary embodiment of the invention, the materialized view may be updated while the materialized view is online.

At block 210, the DBMS 124 may perform a successful commit to the database 140. The successful commit may result in the updates to the base table and materialized view being accessible to other users of the DBMS. In an exemplary embodiment of the invention, the updated materialized view is consistent with the updated base table.

Typically, the DBMS 124 may have an AUTOCOMMIT parameter set to on. Having the AUTOCOMMIT parameter set on may enable the DBMS 124 to automatically commit or rollback a query plan execution when the query plan 134 completes. In an exemplary embodiment of the invention, the AUTOCOMMIT parameter may be set to off when the method 200 is being performed.

Figure 3:
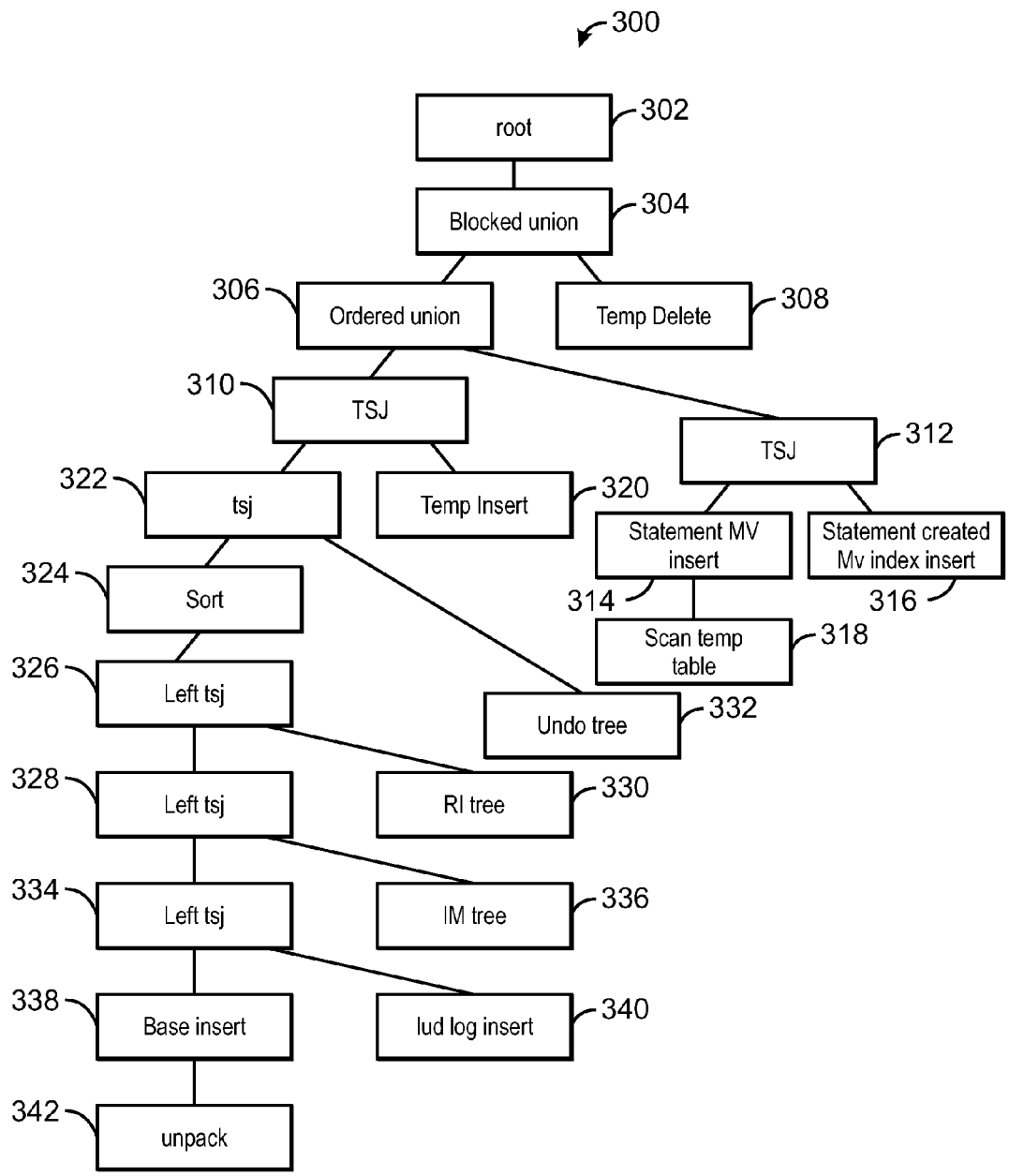
FIG. 3 is a block diagram showing a query plan of a rowset insert according to an exemplary embodiment of the present invention.

FIG. 3 is a block diagram showing a query plan 134 according to an exemplary embodiment of the present invention. The query plan 134 may be represented in a tree structure, such as tree 300. As shown, the tree 300 may include sub-trees, operator nodes, and flow-type nodes, described below. As organized, the tree 300 may indicate a particular order of execution of the operations contained within.

The tree 300 may include sub-trees, such as RI tree 330, undo tree 332, and index maintenance (IM) tree 336. The RI tree 330 may represent operations to enforce RI constraints. The undo tree 332 may represent operations to undo updates to the database 140 in response to errors in the rowset insert. The IM tree 336 may represent operations regarding all of the indices 142 associated with the base table of the rowset insert.

The nodes of the tree 300 may include input-output (I/O) operators 314, 316, 318, 320, 338, 340, 342 that perform the database access and updates. The nodes may also include flow-type operators such as tuple-substitution-join (TSJ) 310, 312, 322, 326, 328, 334, and ordered-union 306. The flow-type operators may indicate a particular order of execution of the query plan 134. The flow-type operators may also indicate how information is exchanged.

The nodes may also include housekeeping operators that indicate internal processing apart from database accesses, such as unpack 342 and sort 324. Unpack 342 may read all the rows specified in the rowset insert SQL.

In an exemplary embodiment of the invention, the sort 324 may represent a blocking operator. The blocking operator may help prevent a race condition. The race condition can cause a delete to be executed before an insert into the same object has completed. As a blocking operator, the sort 324 may prevent the operations specified in the left side of the tree 300 from working on a request until the operations specified in the right side have completed.

In an exemplary embodiment of the invention, the blocking operator may be placed in the tree 300 between the undo tree 332, where the delete operations are performed, and all operators that may raise a constraint violation or expression evaluation error. Execution of the query plan 134 as represented by the tree 300 is described in greater detail with reference to FIG. 4.

Figure 4:
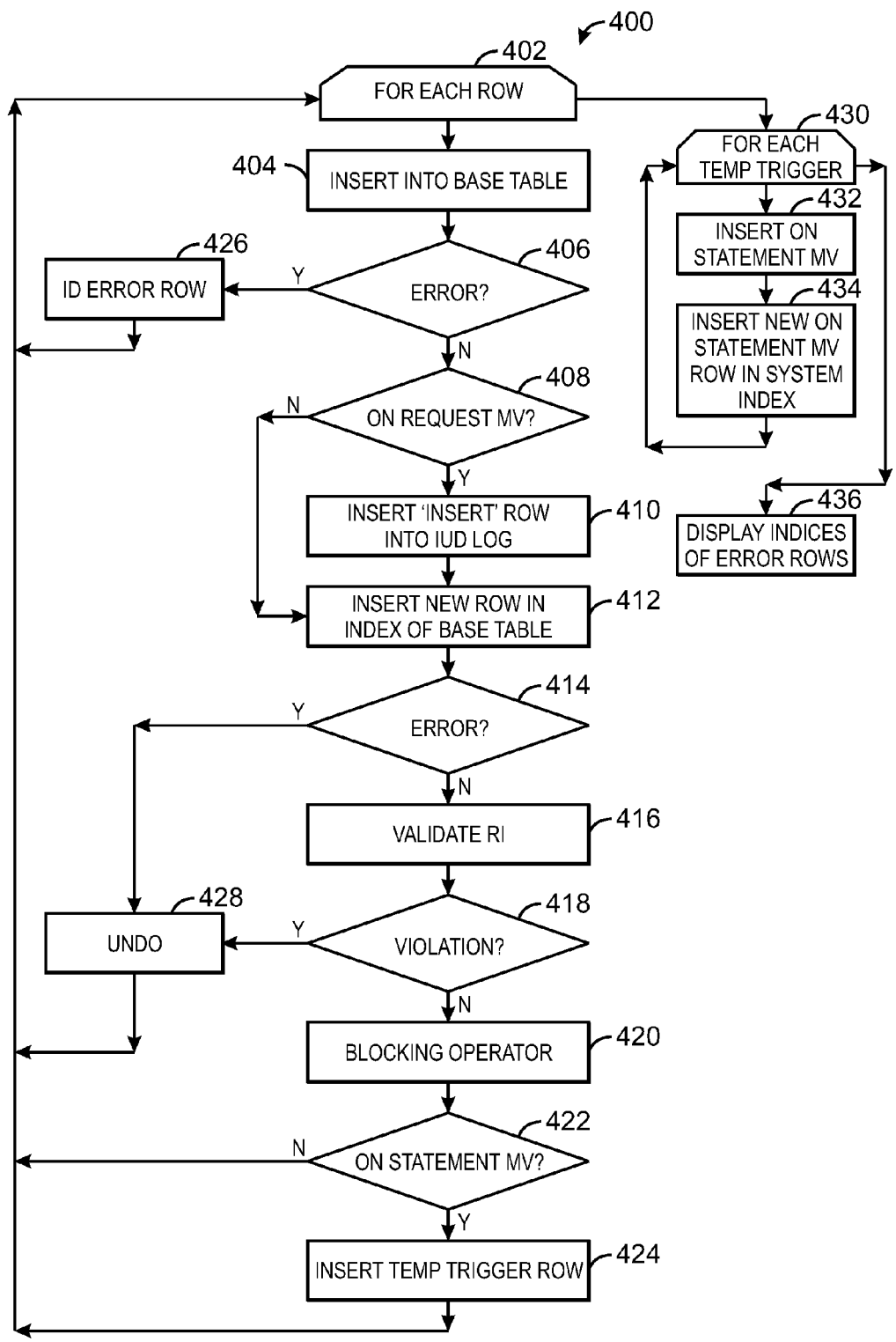
FIG. 4 is a process flow diagram showing a computer-executed method for executing a rowset insert according to an exemplary embodiment of the present invention.

FIG. 4 is a process flow diagram showing a computer-executed method for executing a rowset insert according to an exemplary embodiment of the present invention. The method is generally referred to by the reference number 400, and may be performed by the execution engine 144. It should be understood that the process flow diagram is not intended to indicate a particular order of execution.

The method may begin at block 402. The execution engine 144 may perform blocks 402-428 for each row of the rowset insert.

At block 404, the row may be inserted into the base table. At block 406, the execution engine may determine whether the insert raised a database error. Typically, when an error is raised, the execution engine 144 may halt all execution and rollback any changes to the database 140. However, in an exemplary embodiment of the invention, the insert operator may be modified to treat constraint violation and expression evaluation errors as non-fatal, and allow the execution of the query plan 134 to proceed.

If an error is raised, at block 426, the error row of the rowset insert may be identified. In an exemplary embodiment of the invention, each error row may be identified with an "OK MAY BE MORE" message, with an index indicating a particular row's order in the sequence of rowset being inserted.

If no error is raised, at block 408, the execution engine 144 may determine whether the base table has an on request materialized view (MV). If the base table has an on request materialized view, at block 410, the execution engine may insert an "INSERT" row in the IUD log for the base table's materialized view. As stated previously, the "INSERT" row may create a new row representing the new row in the base table when the materialized view is refreshed.

At block 412, the execution engine may insert a new row in an index 142 for the base table. The new row in the index 142 may represent the new row in the base table.

At block 414, the execution engine may determine whether the insert into the index 142 raised a database error. If an error was raised, at block 428 an undo may be performed. The undo may delete all rows from the base table, indices 142, and materialized views 150 associated with the row that raises the database error. The undo is described in greater detail with reference to FIG. 5.

At block 416, the execution engine 14 may validate the RI, if there are any RI constraints against the base table. The execution engine 144 may create a new entry in the system index 148 for the new row of the base table, if the RI constraint is not violated.

At block 418, the execution engine 144 may determine whether inserting the new row in the base table raises an RI constraint violation. If an RI constraint violation is raised, at block 428 the undo may be performed. If an RI constraint violation is not raised, at block 420, the blocking operator may be performed. As stated previously, the blocking operator may prevent the race condition.

At block 422, the execution engine 144 may determine whether the base table has an on statement MV. If so, at block 424, a trigger row representing the new row in the base table may be inserted in a temporary table. The insert of the trigger rows is represented in the tree 300 as node 320.

As stated previously, the organization of the tree 300 may indicate a particular order of execution of the operations contained within. Typically, the query plan 134 may specify that the trigger rows are inserted before the RI constraints are validated.

However, in an exemplary embodiment of the invention, the node representing the insert of the trigger rows may be disposed within the tree such that all operations that can raise a constraint violation or expression evaluation error are performed before the trigger row insert. As such, all rows inserted into the temporary table may represent rows of the rowset insert that are successfully inserted into the base table, and accompanying indices.

After all rows of the rowset insert have been processed, blocks 430-434 may be performed for each trigger row in the temporary table. At block 432, a new row may be inserted in the on statement MV. At block 434, a new row may be inserted in the system index 148 for the new row in the on statement MV.

At block 436, the indices of the error rows may be displayed to the user. The indices may identify each row in the rowset insert that raised an error. The base table may not include any rows that raised an error.

Figure 5:
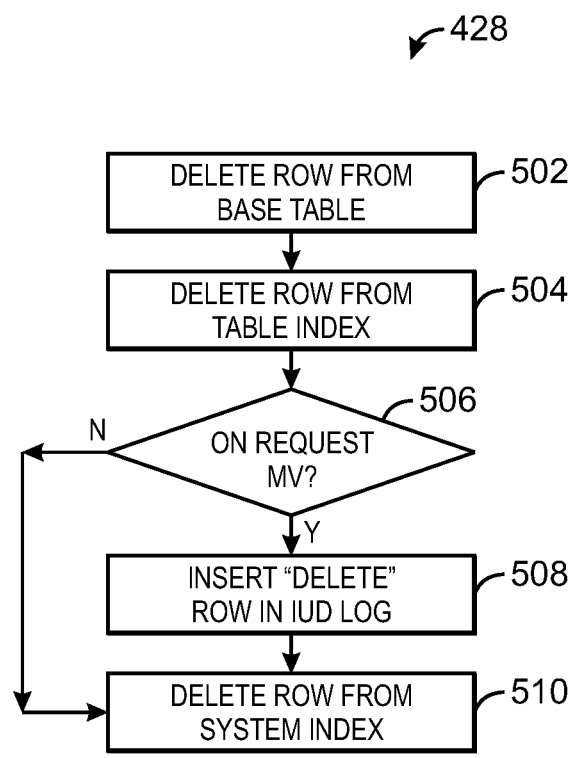
FIG. 5 is a process flow diagram showing a computer-executed method for executing an undo operation according to an exemplary embodiment of the present invention.

FIG. 5 is a process flow diagram showing a computer-executed method for executing an undo operation according to an exemplary embodiment of the present invention. The method is generally referred to by the reference number 428, and may be performed by the execution engine 144. It should be understood that the process flow diagram is not intended to indicate a particular order of execution.

As stated previously, the undo operation may be performed in response to the raising of a constraint violation or expression evaluation error. The method may begin at block 502. At block 502, the execution engine 144 may delete the row corresponding to the error from the base table.

At block 504, a row may be deleted from an index 142 for the base table. In an exemplary embodiment of the invention, the execution engine may use the clustering key of the base table row to identify the row to be deleted.

Using the complete clustering key of each object to be deleted, a keyed single row delete may be performed. If the error row is already present, the row may be deleted. Advantageously, if the row has not been inserted, a no-op may be performed instead.

At block 506, the execution engine 144 may determine whether the base table has an on request materialized view. If so, at block 508, a "DELETE" row may be inserted into the IUD log 152. When the materialized view is refreshed, the "DELETE" row may cancel out the "INSERT" row initially created for the row at block 410.

At block 510, the execution engine 144 may delete the row from the system index 148 corresponding to the row deleted from the base table at block 502. By performing the undo operation as errors are raised, it may be possible to process an entire rowset insert, with errors, within a single pass of the rowset. Additionally, the undo operation updates all tables possibly affected by the rowset insert to be left in a consistent state with each other.

Figure 6:
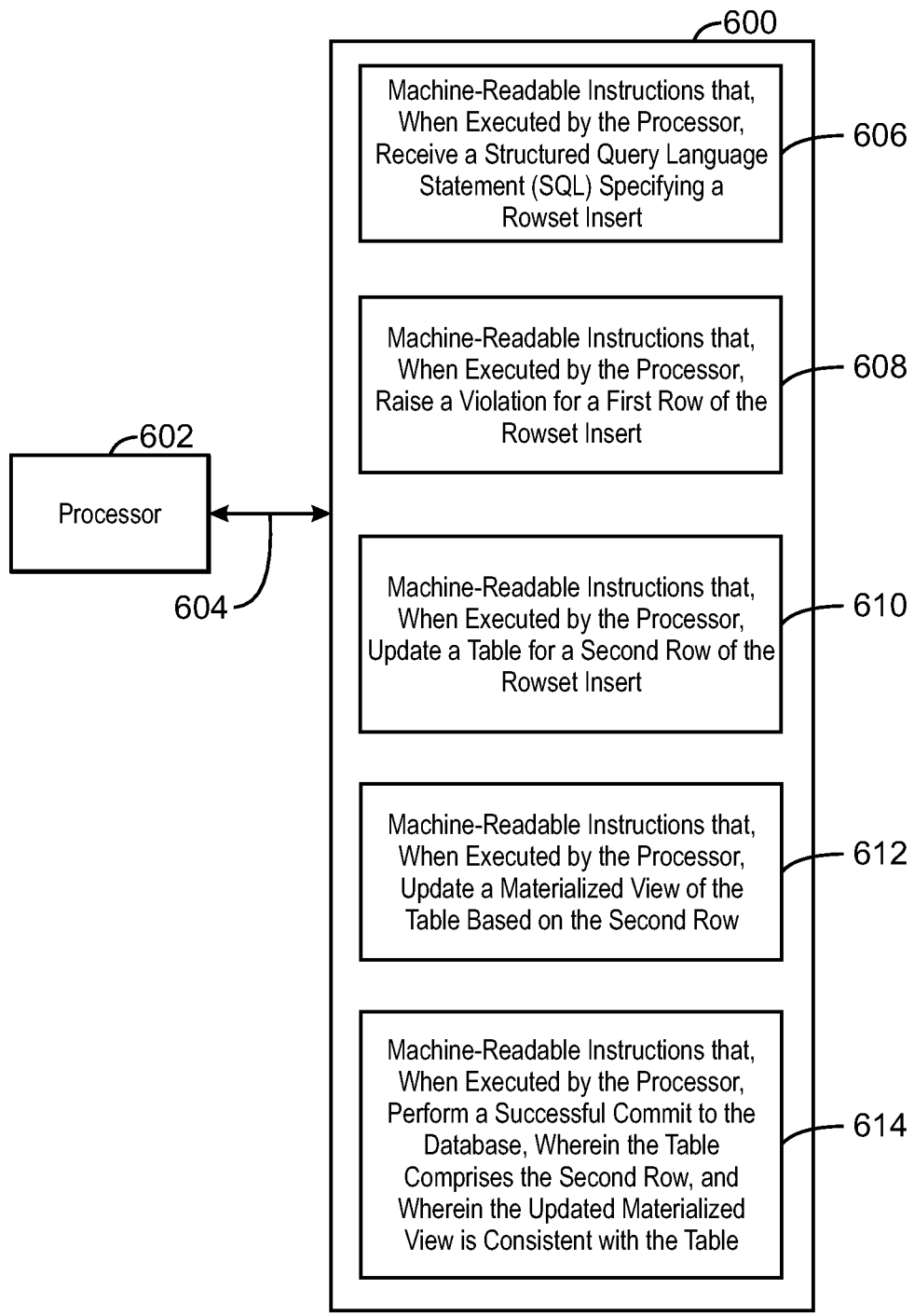
FIG. 6 is a block diagram showing a tangible, machine-readable medium that stores code adapted to perform a rowset insert according to an exemplary embodiment of the present invention.

FIG. 6 is a block diagram showing a tangible, machine-readable medium that stores code adapted to facilitate executing the rowset insert according to an exemplary embodiment of the present invention. The tangible, machine-readable medium is generally referred to by the reference number 600.

The tangible, machine-readable medium 600 may correspond to any typical storage device that stores computer-executed instructions, such as programming code or the like. Moreover, tangible, machine-readable medium 600 may be included in the storage 122 shown in FIG. 1. When read and executed by a processor 602, the instructions stored on the tangible, machine-readable medium 600 are adapted to cause the processor 602 to execute the rowset insert.

A region 606 of the tangible, machine-readable medium 600 stores machine-readable instructions that, when executed by the processor 602, receive a structured query language statement (SQL) specifying the rowset insert. A region 608 of the tangible, machine-readable medium 600 stores machine-readable instructions that, when executed by the processor 602 raise an error for a first row of the rowset insert.

A region 610 of the tangible, machine-readable medium 600 stores machine-readable instructions that, when executed by the processor 602, update a table for a second row of the rowset insert. A region 612 of the tangible, machine-readable medium 600 stores machine-readable instructions that, when executed by the processor 602, update a materialized view of the table based on the second row.

A region 614 of the tangible, machine-readable medium 600 stores machine-readable instructions that, when executed by the processor 602, performs a successful commit to the database, wherein the table comprises the second row, and wherein the updated materialized view is consistent with the table.

What is claimed is:

1. A computer-executed method of executing a rowset insert against a database, comprising:
   receiving a structured query language statement (SQL) specifying the rowset insert;
   raising, within a single transaction, a rowset error for a first row of the rowset insert;
   updating, within the single transaction, a table for a second row of the rowset insert;
   updating, within the single transaction, a materialized view of the table based on the second row; and
   performing, within the single transaction, a commit to the database, wherein the table comprises the second row, and wherein the updated materialized view is consistent with the table.

2. The computer-executed method recited in claim 1, comprising:
   inserting the first row in the table; and
   deleting the inserted first row from the table.

3. The computer-executed method recited in claim 1, comprising:
   inserting an "INSERT" row in an insert, update, delete (IUD) log for the materialized view based on the first row; and
   inserting a "DELETE" row in the IUD log corresponding to the inserted "INSERT" row.

4. The computer-executed method recited in claim 1, comprising:
   inserting an index row based on the first row into an index of the table; and
   deleting the index row from the index.

5. The computer-executed method recited in claim 1, comprising:
   inserting an index row based on the first row into a system index used to enforce referential integrity; and
   deleting the index row from the system index.

6. The computer-executed method recited in claim 1, comprising generating a query plan for the SQL, wherein the query plan comprises:
   an undo operator that comprises an operator to perform at least one of the following:
   deleting the first row from the table;
   inserting a "DELETE" row in the IUD log corresponding to an "INSERT" row in the IUD log based on the first row;
   deleting an index row based on the first row from an index of the table; and
   deleting an index row based on the first row from a system index that the database uses to enforce referential integrity; and a blocking operator that is disposed within the query plan such that updating the table and updating the materialized view is performed before an operation specified by any operator comprised by the undo operator.

7. The computer-executed method recited in claim 6, wherein the undo operator is disposed within the query plan such that any operation that may raise the rowset error occurs before an operation specified by any operator comprised by the undo operator.

8. The computer-executed method recited in claim 6, wherein the materialized view is an on-statement materialized view, and wherein the query plan specifies that any operation that may raise the rowset error occurs before an operation to create a temporary trigger based on the rowset insert for the on-statement materialized view.

9. The computer-executed method recited in claim 1, comprising receiving the rowset insert from a trickle feed.

10. The computer-executed method recited in claim 1, comprising updating the table and updating the materialized view while at least one of the following is true:
the materialized view is online; and
an AUTOCOMMIT parameter of the database is set to OFF.

11. The computer-executed method recited in claim 1, comprising performing the rowset insert within a single execution of the query plan.

12. The computer-executed method recited in claim 1, wherein an index of the table is consistent with the updated table.

13. The computer-executed method recited in claim 1, wherein a system index of referential integrity is consistent with the updated table and a foreign key table, wherein the foreign key table is a table comprising a primary key that is a foreign key in the updated table.

14. The computer-executed method recited in claim 1, comprising generating a message that identifies the first row.

15. A computer system for executing a rowset insert against a database, the computer system comprising:
a processor that is adapted to execute stored instructions;
a memory device that stores instructions, the memory device comprising:
computer-executable code adapted to receive a structured query language statement (SQL) specifying the rowset insert;
computer-executable code adapted to raise, within a single transaction, a rowset error for a first row of the rowset insert;
computer-executable code adapted to update, within the single transaction, a table for a second row of the rowset insert;
computer-executable code adapted to update, within the single transaction, a materialized view of the table based on the second row; and
computer-executable code adapted to perform, within the single transaction, a successful commit to the database, wherein the table comprises the second row, and wherein the updated materialized view is consistent with the table.

16. The computer system recited in claim 15, comprising computer-executed code to generate a query plan for the SQL, wherein the query plan comprises:
an undo operator that comprises an operator to perform at least one of the following:
deleting the first row from the table;
inserting a "DELETE" row in the IUD log corresponding to an "INSERT" row in the IUD log based on the first row;
deleting an index row based on the first row from an index of the table; and
deleting an index row based on the first row from a system index that the database uses to enforce referential integrity; and
a blocking operator that is disposed within the query plan such that updating the table and updating the materialized view is performed before an operation specified by any operator comprised by the undo operator.

17. The computer system recited in claim 16, wherein the undo operator is disposed within the query plan such that any operation that may raise the rowset error occurs before an operation specified by any operator comprised by the undo operator.

18. The computer system recited in claim 16, wherein the materialized view is an on-statement materialized view, and wherein the query plan specifies that any operation that may raise the rowset error occurs before an operation to create a temporary trigger based on the rowset insert for the on-statement materialized view.

19. The computer system recited in claim 15, comprising computer-executed code adapted to execute the rowset insert within a single pass of a rowset of the rowset insert.

20. A tangible, machine-readable medium that stores code adapted to facilitate executing a rowset insert, comprising:
machine-readable instructions that, when executed by the processor, receive a structured query language statement (SQL) specifying the rowset insert;
machine-readable instructions that, when executed by the processor, raise, within the single transaction, a rowset error for a first row of the rowset insert;
machine-readable instructions that, when executed by the processor, update, within the single transaction, a table for a second row of the rowset insert;
machine-readable instructions that, when executed by the processor, update, within the single transaction, a materialized view of the table based on the second row; and
machine-readable instructions that, when executed by the processor, performs, within the single transaction, a successful commit to the database, wherein the table comprises the second row, and wherein the updated materialized view is consistent with the table.

* * * * *